United States Patent
Namuduri et al.

(10) Patent No.: US 12,107,454 B1
(45) Date of Patent: Oct. 1, 2024

(54) EFFICIENT CHARGING OF AN EXTERNAL ENERGY STORAGE SYSTEM FROM A VEHICLE BATTERY SYSTEM

(71) Applicant: GM GLOBAL TECHNOLOGY OPERATIONS LLC, Detroit, MI (US)

(72) Inventors: Chandra S. Namuduri, Troy, MI (US); Rashmi Prasad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 7 days.

(21) Appl. No.: 18/303,123

(22) Filed: Apr. 19, 2023

(51) Int. Cl.
| | |
|---|---|
| H02J 7/34 | (2006.01) |
| B60L 53/22 | (2019.01) |
| H02J 7/02 | (2016.01) |
| H02M 1/08 | (2006.01) |
| H02M 3/335 | (2006.01) |
| H02M 7/219 | (2006.01) |

(52) U.S. Cl.
CPC .............. *H02J 7/342* (2020.01); *B60L 53/22* (2019.02); *H02J 7/02* (2013.01); *H02M 1/08* (2013.01); *H02M 3/33573* (2021.05); *H02M 7/219* (2013.01); *B60L 2210/10* (2013.01); *H02J 2207/20* (2020.01)

(58) Field of Classification Search
CPC ...... H02J 7/34; H02J 7/342; H02J 7/02; H02J 2207/20; B60L 53/22; B60L 2210/10; H02M 3/33573; H02M 1/08; H02M 7/219; H02M 3/335
See application file for complete search history.

(56) References Cited

FOREIGN PATENT DOCUMENTS

DE 102021127204 A1 * 8/2022 .............. B60L 53/16

* cited by examiner

*Primary Examiner* — Robert L Deberadinis
(74) *Attorney, Agent, or Firm* — CANTOR COLBURN LLP

(57) ABSTRACT

A charging system of a vehicle includes a charging device configured to transfer an electric charge between a battery system of the vehicle and a recipient energy storage system, the charging device including a plurality of conversion stages. The charging system also includes a switching system configured to selectively bypass one or more conversion stages during a charging process, the charging process including transferring electric charge from the battery system to the recipient energy storage system, and a first controller configured to operate the switching system based on a voltage range of a recipient charge port of the recipient energy storage system.

20 Claims, 8 Drawing Sheets

EFFICIENT CHARGING OF AN EXTERNAL ENERGY STORAGE SYSTEM FROM A VEHICLE BATTERY SYSTEM

INTRODUCTION

The subject disclosure relates to batteries and battery assemblies, and more particularly to systems and methods for supplying power from a vehicle battery system to another vehicle battery or other external energy storage system.

Vehicles, including gasoline and diesel power vehicles, as well as electric and hybrid electric vehicles, feature battery storage for purposes such as powering electric motors, electronics and other vehicle subsystems. Battery assemblies may be charged using dedicated charging stations and other power sources such as residences and building connected to a power grid. In addition, some vehicles may have the capability to transfer power to external locations, such as by supplying power to battery assemblies of other vehicles and/or to a grid. Such capabilities are useful, for example, in situations in which an electric vehicle is running low on charge and a charging station or other power source is unavailable.

SUMMARY

In one exemplary embodiment, a charging system of a vehicle includes a charging device configured to transfer an electric charge between a battery system of the vehicle and a recipient energy storage system, the charging device including a plurality of conversion stages. The charging system also includes a switching system configured to selectively bypass one or more conversion stages during a charging process, the charging process including transferring electric charge from the battery system to the recipient energy storage system, and a first controller configured to operate the switching system based on a voltage range of a recipient charge port of the recipient energy storage system.

In addition to one or more of the features described herein, the recipient energy storage system is a battery of a recipient vehicle.

In addition to one or more of the features described herein, the charging device includes a bidirectional charger having a direct current (DC)-DC conversion circuit and a DC-alternating current (AC) conversion circuit.

In addition to one or more of the features described herein, the switching system includes a first set of switches connected to a donor charge port of the vehicle and to a bus of the charging device between the DC-AC conversion circuit and the battery system, the first set of switches configured to be closed to bypass both the DC-DC conversion circuit and the DC-AC conversion circuit.

In addition to one or more of the features described herein, the switching system includes a second set of switches connected to the donor charge port and to the bus of the charging device between the DC-DC conversion circuit and the DC-AC conversion circuit, the first set of switches configured to be closed to bypass the DC-AC conversion circuit.

In addition to one or more of the features described herein, the first controller is configured to determine whether the recipient charge port is compatible with an output voltage of the battery system, and the first controller is configured to close the first set of switches prior to an onset of the charging process based on the recipient charge port being compatible with the output voltage, and close the second set of switches prior to the onset of the charging process based on the recipient charge port being incompatible with the output voltage.

In addition to one or more of the features described herein, the first controller is configured to communicate with a second controller of the recipient energy storage system, the second controller configured to control a charger connected to the recipient energy storage system.

In addition to one or more of the features described herein, the charger includes a switching assembly configured to selectively bypass an AC-DC conversion stage of the charger.

In addition to one or more of the features described herein, the second controller is configured to close the switching assembly based on a request from the first controller.

In one exemplary embodiment, a method of transferring charge includes connecting a charging device of a vehicle to a recipient charge port of a recipient energy storage system, the charging device configured to transfer an electric charge between a battery system of the vehicle and a donor charge port the recipient energy storage system, the charging device including a plurality of conversion stages. The method also includes controlling a switching system based on a voltage range of the recipient charge port, the switching system configured to selectively bypass one or more conversion stages of the charging device, and performing a charging process, the charging process including transferring electric charge from the battery system to the recipient energy storage system.

In addition to one or more of the features described herein, the recipient energy storage system is a battery of a recipient vehicle.

In addition to one or more of the features described herein, the charging device includes a bidirectional charger having a direct current (DC)-DC conversion circuit and a DC-alternating current (AC) conversion circuit.

In addition to one or more of the features described herein, the switching system includes a first set of switches connected to a donor charge port of the vehicle and to a bus of the charging device between the DC-AC conversion circuit and the battery system, the first set of switches configured to be closed to bypass both the DC-DC conversion circuit and the DC-AC conversion circuit.

In addition to one or more of the features described herein, the switching system includes a second set of switches connected to the donor charge port and to the bus of the charging device between the DC-DC conversion circuit and the DC-AC conversion circuit, the first set of switches configured to be closed to bypass the DC-AC conversion circuit.

In addition to one or more of the features described herein, controlling the switching system includes determining whether the recipient charge port is compatible with an output voltage of the battery system, closing the first set of switches prior to an onset of the charging process based on the recipient charge port being compatible with the output voltage, and closing the second set of switches prior to the onset of the charging process based on the recipient charge port being incompatible with the output voltage.

In addition to one or more of the features described herein, the vehicle is configured to communicate with a recipient controller of the recipient energy storage system, the recipient controller configured to control a charger connected to the recipient energy storage system.

In addition to one or more of the features described herein, the charger includes a switching assembly configured to selectively bypass an AC-DC conversion stage of the charger, and the method includes requesting that the recipient controller close the switching assembly.

In one exemplary embodiment, a vehicle system includes a battery system and a charging system connected to the battery system of a vehicle. The charging system includes a charging device configured to transfer an electric charge between a battery system of the vehicle and a recipient energy storage system, the charging device including a plurality of conversion stages, a switching system configured to selectively bypass one or more conversion stages during a charging process, the charging process including transferring electric charge from the battery system to the recipient energy storage system, and a first controller configured to operate the switching system based on a voltage range of a recipient charge port of the recipient energy storage system.

In addition to one or more of the features described herein, the charging device includes a bidirectional charger having a direct current (DC)-DC conversion circuit and a DC-alternating current (AC) conversion circuit.

In addition to one or more of the features described herein, the switching system includes at least one of a first set of switches connected to a donor charge port of the vehicle and to a bus of the charging device between the DC-AC conversion circuit and the battery system, the first set of switches configured to be closed to bypass both the DC-DC conversion circuit and the DC-AC conversion circuit, and a second set of switches connected to the donor charge port and to the bus of the charging device between the DC-DC conversion circuit and the DC-AC conversion circuit, the first set of switches configured to be closed to bypass the DC-AC conversion circuit.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
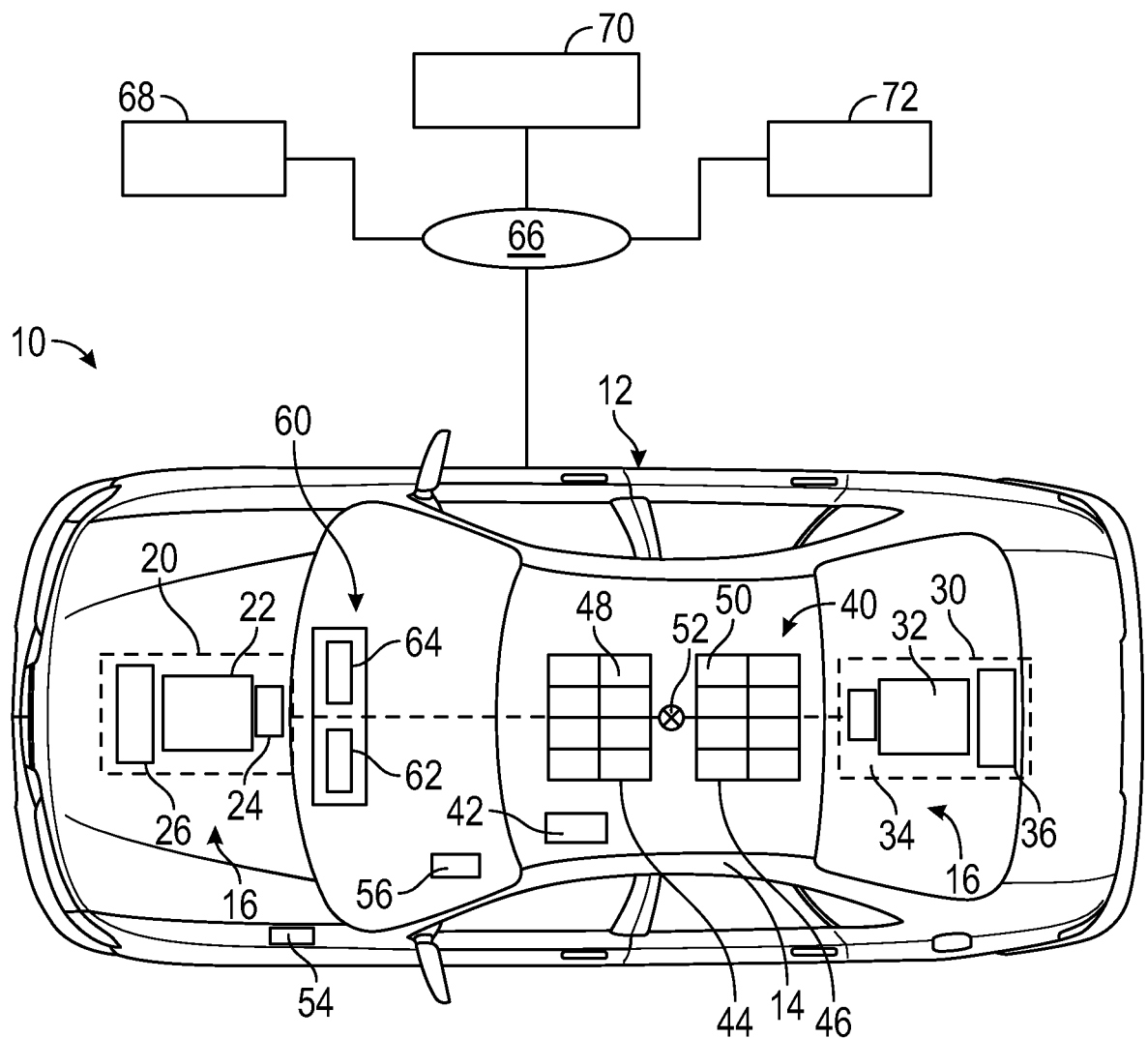
FIG. 1 is a top schematic view of a motor vehicle including a battery system and a charging system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods, devices and systems are provided for transferring charge or energy from a battery assembly of a vehicle (a donor vehicle) to an external energy storage system (e.g., another vehicle or a power grid). In an embodiment, the external energy storage system is a battery of another vehicle (a recipient vehicle). An embodiment of a vehicle charging system includes a controller configured to control a charger and configure the charger based on desired charging parameters to increase or maximize charging efficiency.

In an embodiment, the controller is configured to operate a switching system to selectively bypass one or more conversion stages of the charger. The switching system is operated to minimize the number of conversion stages that power flows through during a charging process, and thereby minimize switching losses.

An embodiment of the switching system includes a first set of switches and/or a second set of switches connected to a bidirectional charger. The charger includes multiple conversion stages, including a bidirectional direct current (DC)-alternating current (AC) conversion stage and a DC-DC conversion stage. The first set of switches is operable to bypass all of the conversion stages of the charger, and the second set of switches is operable to bypass the DC-AC stage.

Embodiments also include methods of transferring charge, which include operating the switching system based on the recipient's charging parameters (e.g., maximum voltage rating). For example, the method includes closing the first set of switches in instances where an output voltage of the donor vehicle is compatible with a voltage range of the recipient vehicle. In another example, the method includes closing the second set of switches to bypass the DC-AC stage in instances where the output voltage is incompatible with a voltage range of the recipient vehicle.

Embodiments described herein present numerous advantages and technical effects. For example, the embodiments improve charging efficiency by minimizing switching losses. Bidirectional chargers that allow for vehicle-to-vehicle (V2V) charging have multiple conversion stages that can cause losses as energy flows from a donor vehicle to a recipient vehicle. In addition, conversion stages in the recipient vehicle's charger can also contribute to losses. Embodiments eliminate or reduce such losses by bypassing unnecessary conversion stages, while delivering an appropriate level of DC voltage.

The embodiments are not limited to use with any specific vehicle or device or system that utilizes battery assemblies, and may be applicable to various contexts. For example, embodiments may be used with automobiles, trucks, aircraft, construction equipment, farm equipment, automated factory equipment and/or any other device or system that may use high voltage battery packs or other battery assemblies.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and if the vehicle is a hybrid electric vehicle, a fuel injection subsystem, an exhaust subsystem and others.

The vehicle 10 may be an electrically powered vehicle (EV), a hybrid vehicle or any other vehicle having an electrical energy source. In an embodiment, the vehicle 10 is an electric vehicle, which includes one or more motors and one or more drive systems. For example, the propulsion system 16 is a multi-drive system that includes a first drive unit 20 and a second drive unit 30. The first drive unit 20 includes a first electric motor 22 and a first inverter 24, as well as other components such as a cooling system 26. The second drive unit 30 includes a second electric motor 32 and a second inverter 34, and other components such as a cooling system 36. The inverters 24 and 34 (e.g., traction power inverter units or TPIMs) each convert DC power from a high voltage (HV) battery system 40 to poly-phase (e.g., two-phase, three-phase, six-phase, etc.) alternating current (AC) power to drive the motors 22 and 32.

As also shown in FIG. 1, the drive systems are configured such that the first electric motor 22 drives front wheels (not shown) and the second electric motor 32 drives rear wheels (not shown). However, embodiments are not so limited, as there may be any number of drive systems and/or motors at various locations (e.g., a motor driving each wheel, twin motors per axle, etc.). For example, the vehicle may have a single drive unit.

In the propulsion system 16, the drive unit 20 and the drive unit 30 are electrically connected to the battery system 40. The battery system 40 may also be electrically connected to other components, such as vehicle electronics (e.g., via an auxiliary power module or APM 42). The battery system 40 may be configured as a rechargeable energy storage system (RESS).

The battery system 40 includes one or more battery assemblies. For example, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the inverter 24, and a second battery pack 46 connected to the inverter 34. The battery pack 44 includes a plurality of battery modules 48, and the battery pack 46 includes a plurality of battery modules 50. Each module 48, 50 includes a number of individual cells (not shown).

The battery system 40 can be configured to provide different output voltage levels. For example, a battery switching device 52 is included for selectively connecting the battery pack 44 to the battery pack 46 in series to provide a relatively high voltage (e.g., 800V). The battery switching device 52 can also be operated to connect the battery packs in parallel to provide a relatively low voltage (e.g., 400 V).

The vehicle 10 also includes a charging system, which can be used to charge the battery system 40 and/or to supply power from the battery system 40 to charge another energy storage system (e.g., vehicle-to-vehicle (V2V) and/or vehicle-to-everything (V2X) charging). The charging system is connected to one or more charge ports 54 for charging from an energy storage system such as a utility AC power supply or from a DC fast charge (DCFC) station.

In an embodiment, the charging system includes at least one onboard charging module (OBCM) 56 that is electrically connected to the charge port 54. The OBCM includes a charging circuit (also referred to as a "charger") that is used to convert charging current based on charging parameters and configurations of power sources and recipient vehicles (or other recipient systems).

Although only one OBCM 56 is shown, embodiments are not so limited. For example, there may be a separate OBCM for each battery pack.

The vehicle 10 also includes a computer system 60 that includes one or more processing devices 62 and a user interface 64. The computer system 60 may communicate with the charging system controller, for example, to provide commands thereto in response to a user input. The various processing devices, modules and units may communicate with one another via a communication device or system, such as a controller area network (CAN) or transmission control protocol (TCP) bus.

In addition, charging system, the OBCM 56, the computer system 60 and/or other processing components in the vehicle 10 may be configured to communicate with various remote devices and systems such as charge stations and other vehicles. Such communication can be realized, for example, via a network 66 (e.g., cellular network, cloud, etc.) and/or via wireless communication. For example, the vehicle 10 may communicate with one or more charging stations 68, a remote entity 70 (e.g., a workstation, fleet management system, a computer, a server, a service provider, a technician, an engineer, etc.), and/or another vehicle 72.

In an embodiment, the OBCM 56 is a bidirectional charger that permits both charging the battery system 40 and discharging the battery system 40 to supply charge to an external power storage device, such as the battery system of another vehicle (V2V charging).

Figure 2:
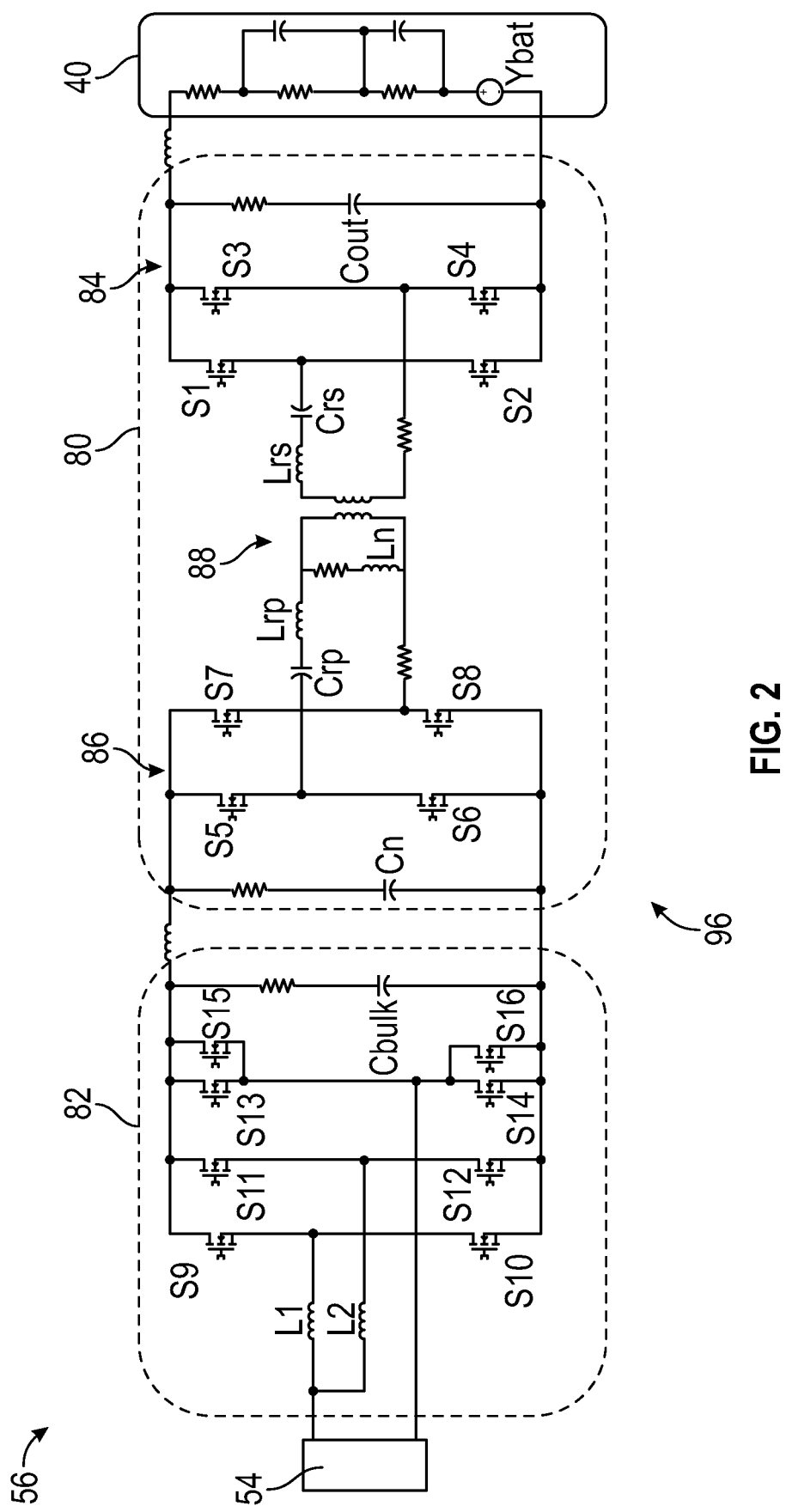
FIG. 2 depicts an example of a bidirectional charging device or charger.

FIG. 2 depicts an embodiment of the OBCM 56 having a bidirectional topology. The OBCM 56 includes charging circuitry (charger) 96 that includes multiple switching stages for converting between AC and DC current and controlling voltage. A DC-DC conversion circuit 80 is configured to step up or step down voltage, and an AC/DC conversion circuit 82 is configured to convert current from AC to DC, or DC to AC. The OBCM 56 can transmit power in both directions and can thus be used for both charging and discharging the onboard HV battery system 40.

In an embodiment, the DC-DC conversion circuit 80 is an isolated CLLC converter that includes a full bridge circuit 84 including switches S1, S2, S3 and S4, and a full bridge circuit 86 including switches S5, S6, S7 and S8. A CLLC resonant tank or circuit is formed by a transformer 88, capacitors $C_{rs}$ and $C_{rp}$, and inductors $L_{rp}$, $L_{rs}$ and $L_n$.

The AC/DC conversion circuit 82, in an embodiment, is a power factor correction (PFC) converter that combines rectification and power conversion. In this embodiment, the circuit 82 includes inductors L1 and L2 connected to high frequency legs, and a bulk capacitor $C_{bulk}$. A first high frequency (HF) leg includes switches S9 and S10, and a second HF leg includes switches S11 and S12. A low frequency leg includes switches S13, S14, S15 and S16.

When the vehicle 10 is connected to an external energy storage system, such as another vehicle's battery system, the circuit 84 converts DC current from the battery system 40 to AC (DC-AC stage). The resonant circuit causes a change in voltage, and the circuit 86 converts AC current to DC (AC-DC stage). The circuit 82 converts the DC current to AC current (DC-AC stage).

Figure 3:
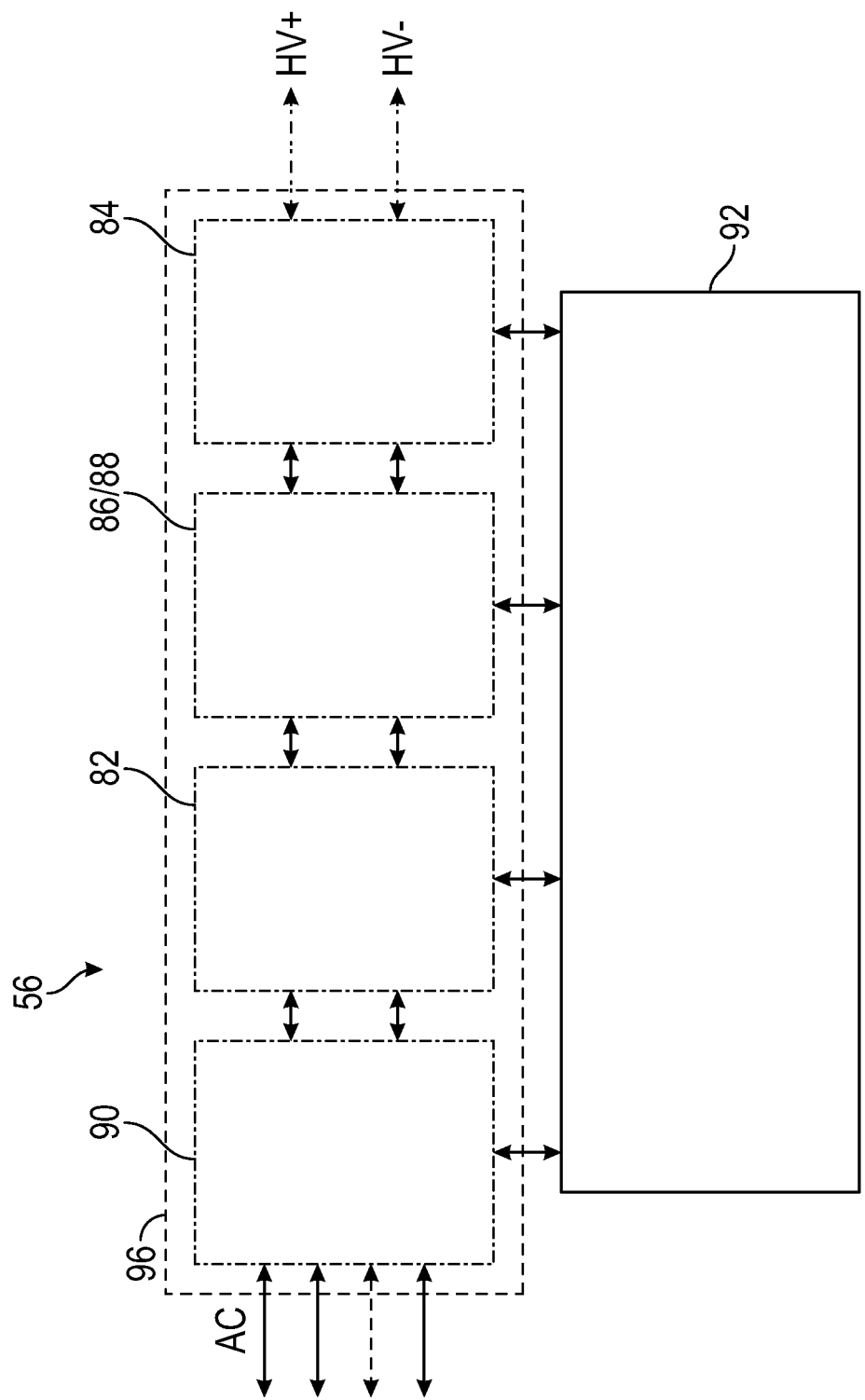
FIG. 3 depicts a charging module of a vehicle, in accordance with an exemplary embodiment.

FIG. 3 schematically depicts the OBCM 56, which includes the charger 96. As shown, power can flow in the forward or reverse direction. For example, when the OBCM 56 is connected to another vehicle, high voltage DC current is input to the circuit 84, which converts the DC current to AC and filters current ripple. The circuit 86 and resonant circuit (including the transformer 88) adjust voltage and convert the AC current to DC current, which is provided to the circuit 82 for conversion and filtering. Additional components (represented by block 90) may be included for current limiting and noise removal (e.g., EMI filtering).

A controller 92 controls various operations of the OBCM 56. The controller 92 may be powered by auxiliary power (e.g., from the APM 42), and can communicate (e.g., over a CAN bus) with another vehicle system, such as a vehicle controller or the computer system 60. The controller 92 includes components such as switch drivers, isolators, sensor interfaces, and a communication interface. Processing components are included for control of charging parameters and switching, communications, diagnostics, protection and thermal management.

It is noted that embodiments described herein are not limited to the charging system described herein, as the charger 96 may include any suitable types of conversion circuits. For example, the bidirectional DC-DC converter stage (conversion circuit 80) may use dual active bridge rectifiers with phase shift and pulse width modulation (PWM) control in place of the CLLC converter. Each of the converter stages could also include plurality of identical circuits operating in parallel for scalable charging and/or discharging power capability. In case of 3-phase AC input, three identical converters could be operated in parallel, except that the AC input of each converter is connected to a separate phase of a utility line or other power source.

The charging system is configured to control various charging operations, including V2V and V2X charging operations. The charging system is able to control charging to increase efficiency as compared to existing systems. As noted above, multiple stages of power conversion during charging can introduce inefficiencies. The charging system reduces or eliminates such inefficiencies by, for example, bypassing certain power conversion stages based on charging parameters such as a voltage rating of a recipient battery system.

Figure 4:
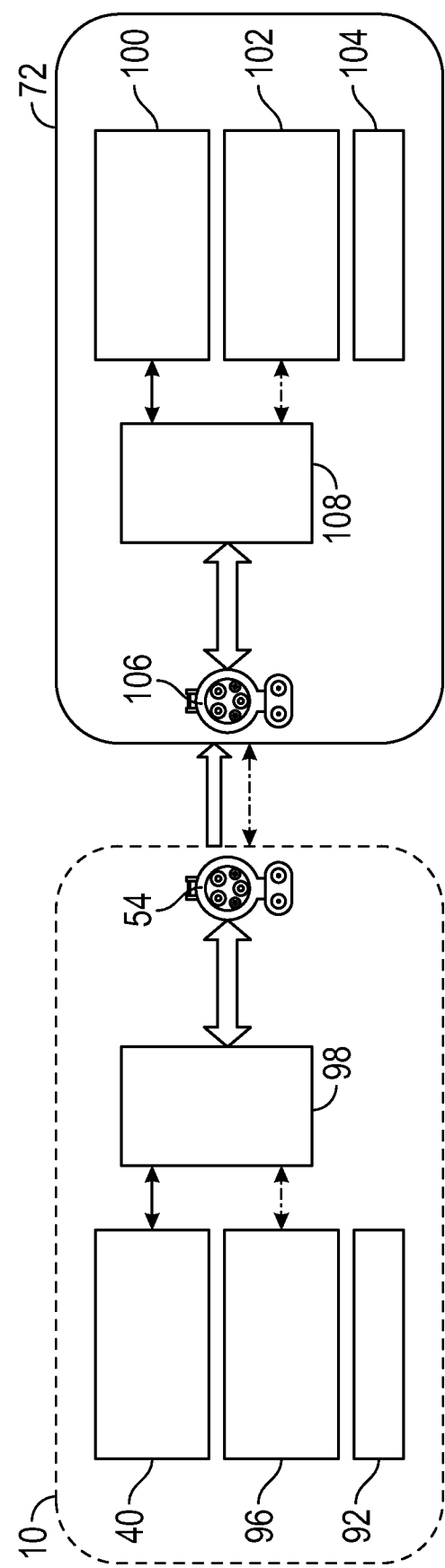
FIG. 4 schematically depicts aspects of an electric vehicle including a charging system, the charging system connected to a recipient vehicle, in accordance with an exemplary embodiment.

FIG. 4 schematically depicts components of the charging system of the vehicle 10, and also depicts components of another vehicle, such as the vehicle 72 of FIG. 1. The vehicle 72 can receive charge from the vehicle 10 when respective charge ports are connected, and is referred to as a recipient vehicle 72.

The charging system of the vehicle 10 includes a bidirectional onboard charger (OBC), which may be part of the OBCM 56. For example, the OBC is the charger 96 of FIG. 2, including the conversion stages defined by the circuits 80 and 82. The charging system also includes a switching system 98 that can be controlled by the controller 92 to switch between various charging states. The charging system can be transitioned between charging states based on the power or charging requirements of the recipient vehicle 72, to reduce losses due to conversion stages.

In this example, the recipient vehicle 72 includes a battery system 100 (e.g., one or more high voltage battery packs). A charger 102 includes components for controlling aspects of charging the battery system 100 (e.g., filtering, conversion etc.), and is connected to a controller 104. An AC charge port 106 is configured to receive AC power, and may also be capable of receiving DC power. For example, the AC charge port 106 is configured to be able to receive an AC charging current from a residential outlet or other AC source.

The vehicle 72 may also include a switching system 108. The switching system 108 includes one or more switches for selectively bypassing one or more stages of the charger 102. In an embodiment, the switching system 108 is controllable in conjunction with control of the charger 96 and the switching system 98 of the vehicle 10 as discussed further herein. The vehicles may communicate wirelessly as shown in FIG. 1, or communicate via an interface cable connecting the charge ports of the vehicles.

Figure 5:
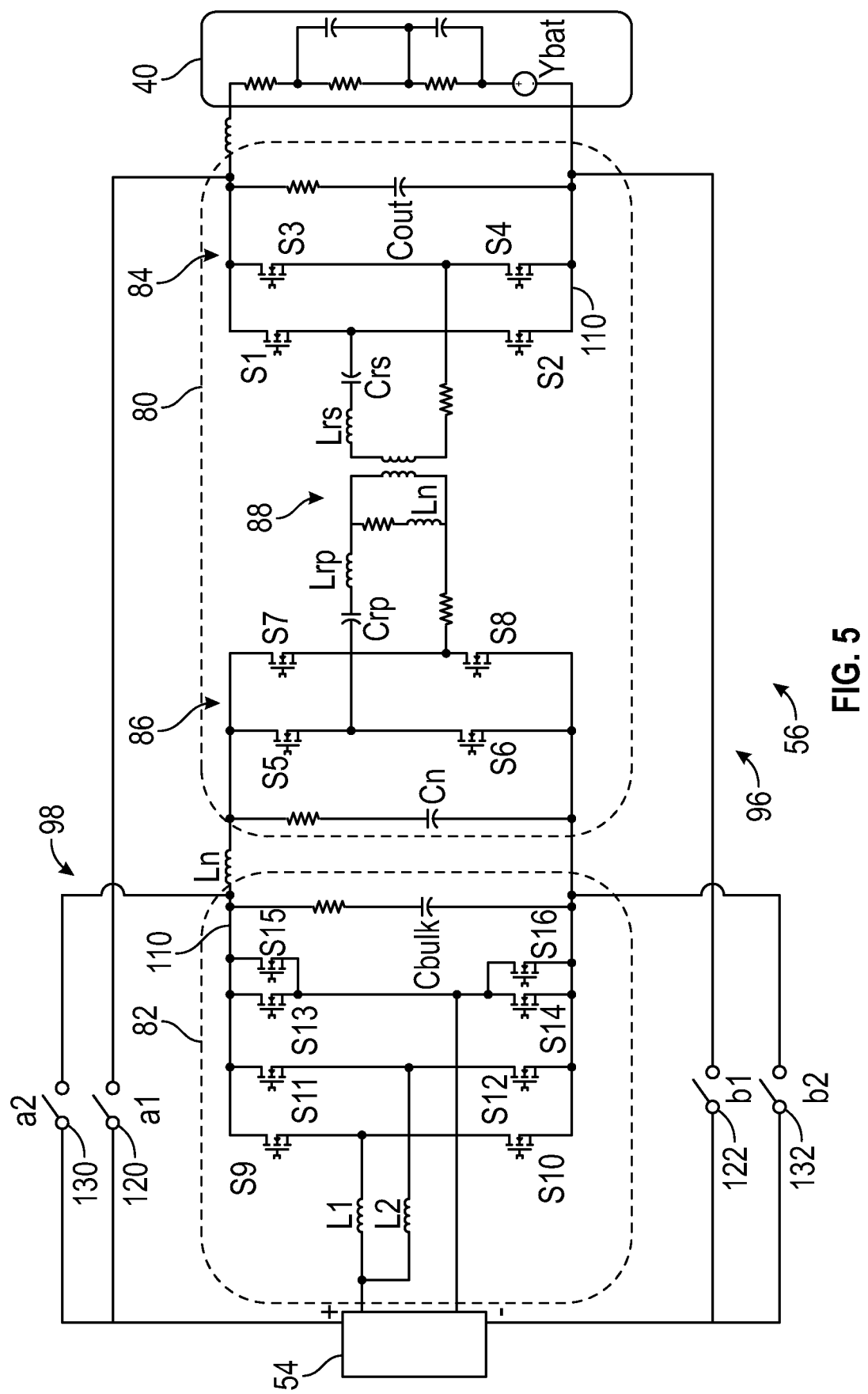
FIG. 5 depicts a charger of a vehicle charging system and a switching system for selectively bypassing one or more conversion stages of the charger, in accordance with an exemplary embodiment.

FIG. 5 depicts the charger 96 and an embodiment of the switching system 98. The switching system 98 includes one or more sets (i.e., one or more) of switches for selectively bypassing one or more conversion stages of the charger 96. The charger 96 can be transitioned between different charging states by selecting a corresponding switching state of the switching system at the onset of a charging process, based on the charging parameters of the battery system of the recipient vehicle 72 or other energy storage system. Efficiency is improved, for example, by eliminating power flow through unnecessary conversion stages and thereby reducing or minimizing switching and/or conduction losses.

In an embodiment, the switching system 98 includes a first set of switches 120 (a1) and 122 (b1) configured to selectively bypass all of the conversion stages of the charger 98. The switch 120 is connected to a positive terminal of the charge port 54 and to a positive side of a charger bus 110 between the circuit 80 and the battery system 40. The switch 122 is connected to a negative terminal of the charge port 54 and to a negative side of the charger bus 110 between the circuit 80 and the battery system 40.

The first set of switches 120 and 122 are operable to put the charger 96 in a charging state in which all of the conversion stages are bypassed and DC current from the battery system 40 is transmitted directly from the battery system 40 to the charge port 54. This charging state is useful, for example, in situations where the recipient vehicle's charge port (e.g., the charge port 106) is compatible with the output voltage range of the battery system 40 (e.g., if the output voltage is within a maximum voltage rating of the recipient vehicle charge port). In such situations, the switches 120 and 122 may be closed so that DC current from the battery system 40 is directly transmitted to the recipient vehicle. The recipient vehicle charger (e.g., the charger 102) may be used to process and/or convert the received DC current as desired.

In an embodiment, the switching system 98 includes a second set of switches 130 (a2) and 132 (b2) configured to selectively bypass the circuit 82 (DC-AC stage) of the charger 98. The switch 130 is connected to the positive terminal of the charge port 54 and to the positive side of the charger bus 110 between the circuit 80 and the circuit 82. The switch 132 is connected to the negative terminal of the charge port 54 and to the negative side of the charger bus 110 between the circuit 80 and the circuit 82.

The second set of switches 130 and 132 are operable the bypass a conversion stage, for example, in situations where the recipient vehicle's charge port is not compatible with the output voltage range of the battery system 40 (e.g., the output voltage exceeds the maximum voltage rating of the charge port). In such situations, the switches 130 and 132 may be closed so that circuit 80 can step down or reduce the output voltage from the battery system 40, and the circuit 82 is bypassed so that DC current is transmitted to the recipient vehicle at a voltage that is compatible with the recipient vehicle charge port.

Although the switching system 98 is shown as having both sets of switches, embodiments are not so limited. For example, the switching system 98 may include only one of the sets of switches. In addition, embodiments are not limited to the specific locations on the charger bus 110, as the switches can be connected at any suitable location of the charger circuitry to achieve the bypass functions described herein.

Figure 6:
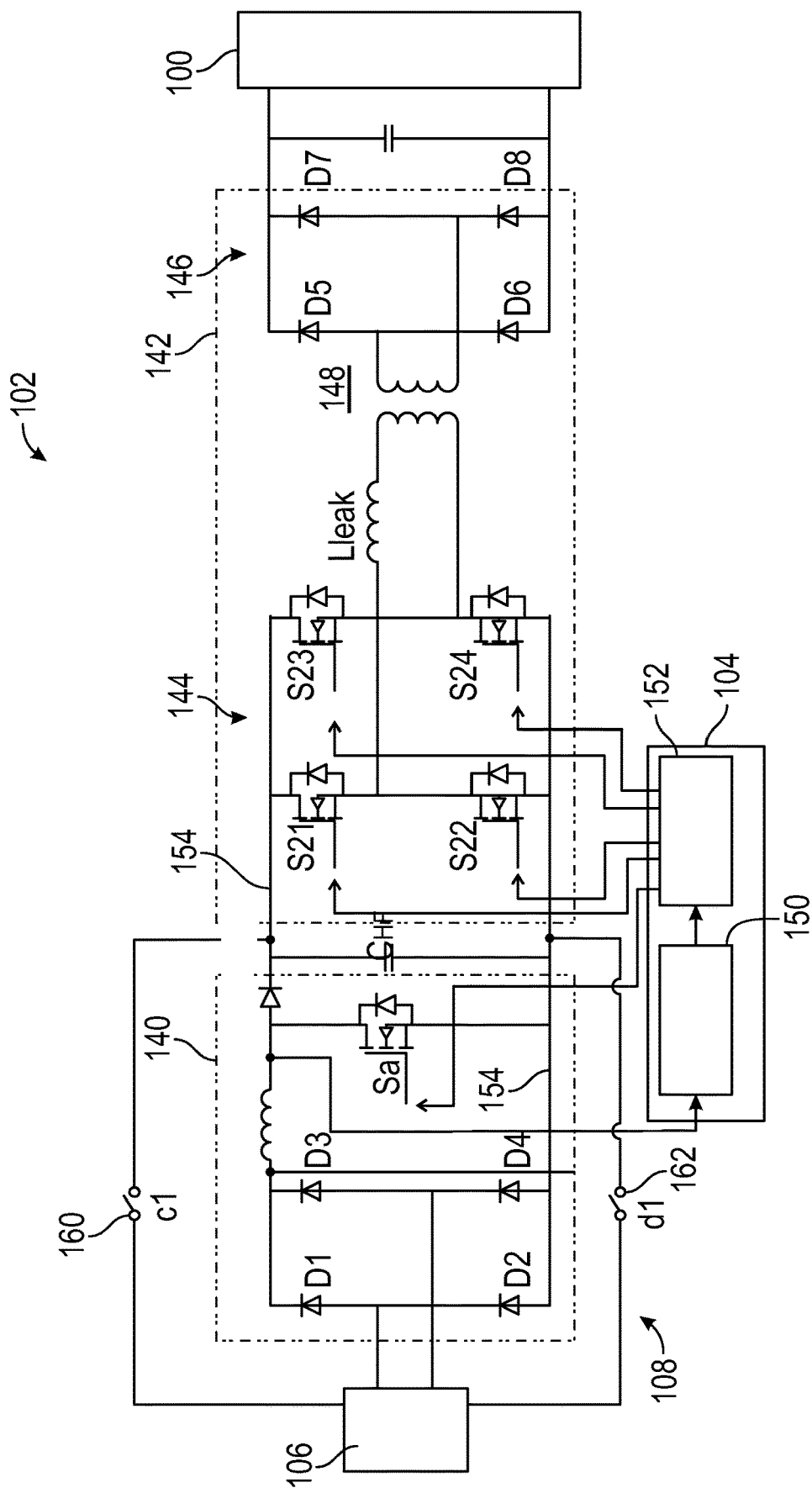
FIG. 6 depicts a charger of a recipient vehicle, in accordance with an exemplary embodiment.

FIG. 6 depicts an example of the charger 102 of the recipient vehicle 72, and also depicts an embodiment of a recipient vehicle switching system that can be operated in conjunction with the OBCM 56 and switching system 98 of the vehicle 10. As discussed further herein, the recipient vehicle switching system can be used to facilitate charging and increase efficiency by bypassing one or more conversion stages in the charger 102.

The charger 102 is a unidirectional charger that includes multiple switching stages for converting between AC and DC current and controlling voltage. An AC-DC conversion circuit 140 is configured to receive AC current, and convert the AC current to DC. A DC-DC conversion circuit 142 steps up or steps down voltage based on the voltage range of the battery system 100.

The conversion circuit 140 is, for example, an active PFC rectification circuit that includes a full diode bridge (diodes D1, D2, D3 and D4), and a boost converter including an inductor, a PFC diode and an active switch Sa. A high frequency capacitor CHF filters current ripple.

The circuit 142 includes a full bridge circuit 144 including switches S21, S22, S23 and S24, and a rectifier circuit 146 including diodes D5, D6, D7 and D8. An optional resonant tank circuit or zero voltage switching circuit includes a transformer 148 and an inductor (denoted as $L_{leak}$).

The controller 104 controls various operations of the charger 102, and can communicate with the vehicle 10 wirelessly or via an interface cable. For example, the controller 104 includes a current controller 150 that provides current measurements to a PWM generator 152. The controller 104 may include components such as switch drivers, isolators, sensor interfaces, communication interface. Processing components are included for control of charging parameters and switching, communications, diagnostics, protection and thermal management.

In an embodiment, the charger 102 includes the switching system 108. The switching system 108 includes a set of switches 160 (c1) and 162 (c2) that are operable by the controller 104 (or other suitable processing device) to bypass the circuit 140 (AC-DC stage). In this way, efficiency can be further increased so that the received DC current does not pass through the AC-DC stage, thereby eliminating losses due to the AC-DC stage.

The switch 160 is connected to a positive terminal of the charge port 106 and to a positive side of a charger bus 154 between the circuit 140 and the circuit 142. The switch 162 is connected to a negative terminal of the charge port 106 and to the negative side of the charger bus 154 between the circuit 140 and the circuit 142.

Figure 7:
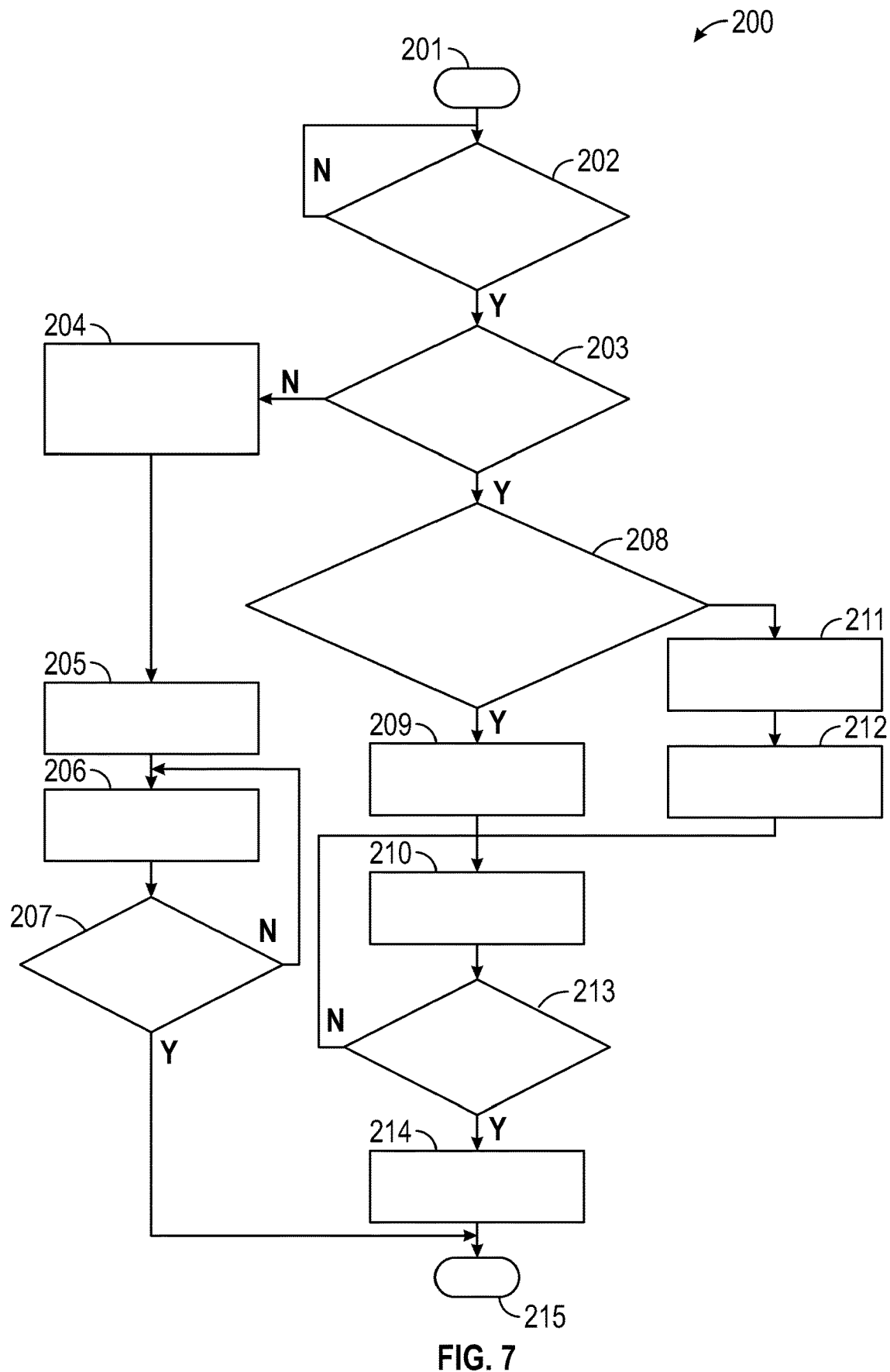
FIG. 7 is a flow diagram depicting aspects of a method of transferring charge or energy from a donor vehicle to a recipient vehicle, in accordance with an exemplary embodiment.

FIG. 7 illustrates embodiments of a method 200 of transferring charge from a battery system of a vehicle (a first vehicle or donor vehicle) to an energy storage device such as a battery system of another vehicle (a second vehicle or recipient vehicle). Aspects of the method 200 may be performed by a processor or processors disposed in a vehicle, such as the controller 96. In an embodiment, the method 200 is performed in conjunction with a processing device in the recipient vehicle (or processing device connected to a recipient energy storage system). For example, aspects of the method 200 are performed by the controller 96 in conjunction with the recipient vehicle controller 104. It is noted the method 200 is not so limited and may be performed by any suitable processing device or system, or combination of processing devices.

The method 200 includes a number of steps or stages represented by blocks 201-215. The method 200 is not limited to the number or order of steps therein, as some steps represented by blocks 201-215 may be performed in a different order than that described below, or fewer than all of the steps may be performed.

The method 200 is described in conjunction with the vehicle 10 and the OBCM 56 of FIG. 2 for illustration purposes. The method 200 is not so limited and can be used with any suitable vehicle battery system and any suitable charging system. In addition, the method 200 is described as being performed to charge the battery system 100 of the recipient vehicle 72; however, the method may be performed in conjunction with any vehicle having a battery system and suitable charge port, or any suitable external energy storage system.

At block 201, a charging process is initiated. The charging process many be initiated by putting the vehicle 10 into a charging mode and connecting the charge port 54 to the AC charge port 106 of the recipient vehicle 72 via a charging cable. In an embodiment, the vehicle 10 and/or the controller 96 can communicate with the recipient vehicle 72 over the charging cable.

The controller 96 determines various charging parameters such as the second vehicle's nominal battery voltage, maximum allowable charge current and desired charge energy. This information can be received via user input, a wireless signal from the recipient vehicle, a signal transmitted over the charging cable, or otherwise.

At block 202, the controller 96 determines whether the charging systems of the vehicles are appropriately linked. If not, the method 200 returns to block 201.

At block 203, if the charging link is properly established, the controller 96 determines whether a high efficiency charging mode is enabled. If the high efficiency charging mode is not enabled or not available, a normal AC charging operation is performed at blocks 204-207. If this charging mode is enabled, a high efficiency charging operation is performed at blocks 208-214.

At block 204, as part of the normal AC charging operation, the controller 96 verifies that the switching systems are inactive (i.e., the switches of each switching system are open). For example, the controller 96 verifies that the switches 120 (a1), 122 (b1), 130 (a2) and 132 (b2) are all open. If any of these switches are closed, the controller 96 opens any closed switches. If the recipient vehicle 72 includes a switching system such as the switching system of FIG. 6, the controller 96 verifies that the switches 160 (c1) and 162 (d1) are open by communicating with the controller 104 (and instructing the controller 104 to open any closed switches).

At block 205, the controller 96 controls charging by operating the OBCM 54 and outputting an AC current. At block 206, the battery system 100 of the recipient vehicle is charged via the charger 102.

At block 207, the controller 96 monitors the charging operation and communicates with the controller 104 to determine whether the battery system 100 has been sufficiently charged. If not, normal charging continues. When the battery system 100 is sufficiently charged, the method ends at block 215.

At block 208, the high efficiency charging operation commences, and the controller 96 determines whether the recipient charge port 106 is compatible with the output voltage of the battery system 40. The controller 96 determines whether the output voltage is within a selected voltage range associated with the charge port 106. For example, the controller determines whether the output voltage is less than a maximum allowable voltage.

At block 209, if the recipient charge port 106 is compatible, the switching system is operated so that all of the conversion stages of the OBCM 56 are bypassed. For example, the controller 96 closes switches 120 and 122 to bypass the circuits 80 and 82.

If the recipient vehicle 72 includes the switches 160 and 162, the switches 160 and 162 are closed to bypass the AC-DC stage of the charger 102. For example, the controller 96 sends a request to the controller 104 to close the switches 160 and 162.

At block 210, the controller 96 controls charging through the OBCM 56. In this switching state, DC current is directly transmitted from the battery system 40 through the charging cable to the recipient vehicle 72. If the switches 160 and 162 are closed, the received DC current bypasses the AC-DC conversion stage of the charger 102, and the controller 104 may control the DC-DC stage to change the voltage if desired.

At block 211, if the recipient battery voltage is incompatible, the switching system is operated so that only the DC-AC stage (circuit 82) is bypassed, so that DC current from the battery system 40 flows through the circuit 84. For example, the controller 96 closes switches 130 and 132. If the recipient vehicle 72 includes the switches 160 and 162, the switches 160 and 162 are closed to bypass the AC-DC stage of the OBC 108. For example, the controller 96 sends a request to the controller 104 to close the switches 160 and 162.

At block 212, the controller 96 controls charging through the OBCM 56. In this switching state, DC current is transmitted from the battery system 40 directly to the circuit 80 and the voltage is adjusted to be within the charging parameters of the recipient vehicle 72. DC current at the adjusted voltage is then transmitted through the charging cable. If the switches 160 and 162 are closed, the received DC current bypasses the AC-DC conversion stage and the controller 104 may control the DC-DC stage to change the voltage if desired.

At block 213, the controller 96 monitors the charging operation and communicates with the controller 104 to determine whether the recipient battery system 100 has been sufficiently charged. If not, charging continues according to block 210 or 212. When the battery system 100 is sufficiently charged, all of the switches are opened (or maintained in an open position) at block 214, and the method ends at block 215.

Figure 8:
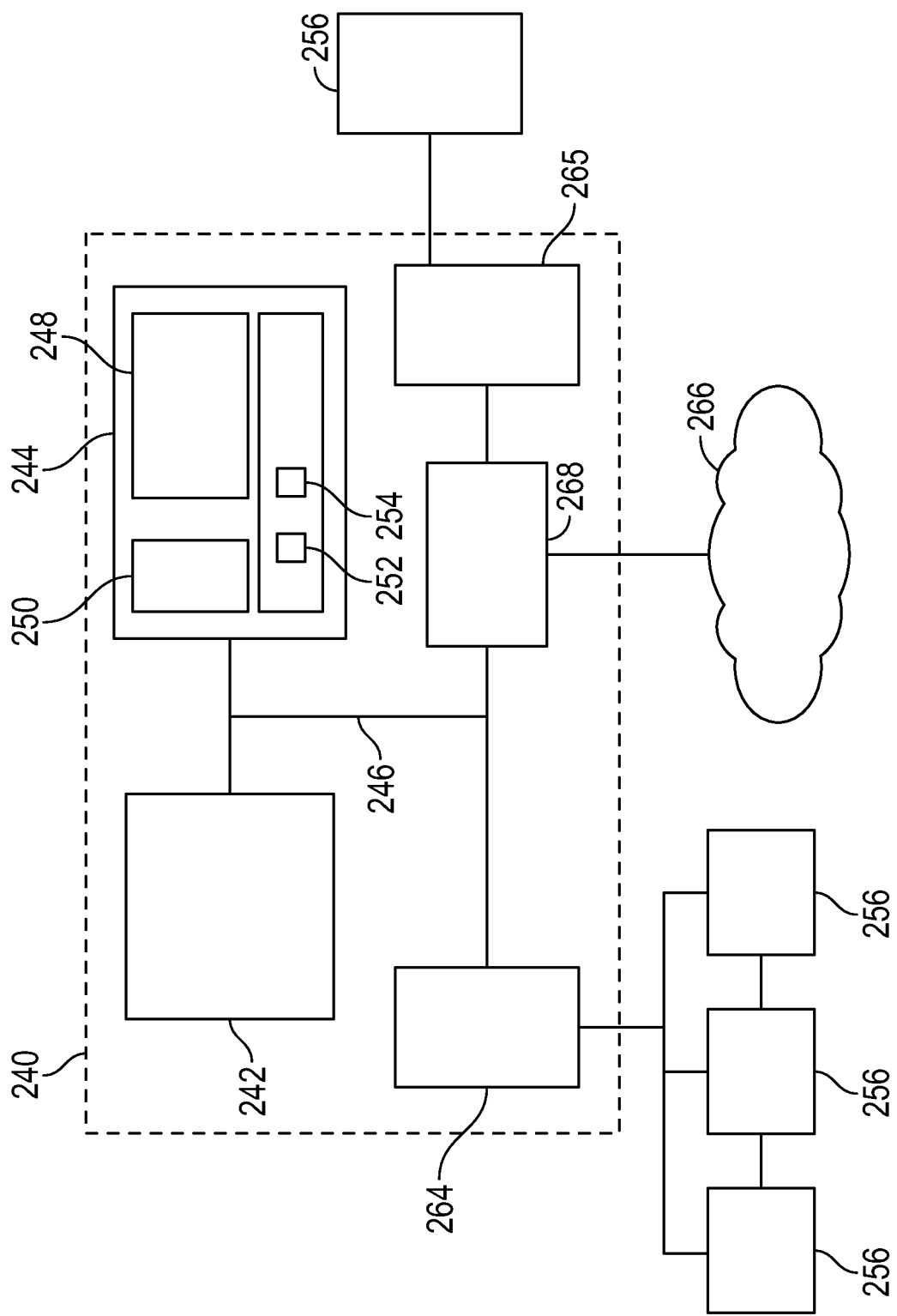
FIG. 8 depicts a computer system in accordance with an exemplary embodiment.

FIG. 8 illustrates aspects of an embodiment of a computer system 240 that can perform various aspects of embodiments described herein. The computer system 240 includes at least one processing device 242, which generally includes one or more processors for performing aspects of image acquisition and analysis methods described herein.

Components of the computer system 240 include the processing device 242 (such as one or more processors or processing units), a memory 244, and a bus 246 that couples various system components including the system memory 244 to the processing device 242. The system memory 244 can be a non-transitory computer-readable medium, and may include a variety of computer system readable media. Such media can be any available media that is accessible by the processing device 242, and includes both volatile and non-volatile media, and removable and non-removable media.

For example, the system memory 244 includes a non-volatile memory 248 such as a hard drive, and may also include a volatile memory 250, such as random access memory (RAM) and/or cache memory. The computer system 240 can further include other removable/non-removable, volatile/non-volatile computer system storage media.

The system memory 244 can include at least one program product having a set (i.e., at least one) of program modules that are configured to carry out functions of the embodiments described herein. For example, the system memory 244 stores various program modules that generally carry out the functions and/or methodologies of embodiments described herein. A module 252 may be included for performing functions related to acquiring signals and data, and a module 254 may be included to perform functions related to control of charging as discussed herein. The system 240 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 242 can also communicate with one or more external devices 256 as a keyboard, a pointing device, and/or any devices (e.g., network card, modem, etc.) that enable the processing device 242 to communicate with one or more other computing devices. Communication with various devices can occur via Input/Output (I/O) interfaces 264 and 265.

The processing device 242 may also communicate with one or more networks 266 such as a local area network (LAN), a general wide area network (WAN), a bus network and/or a public network (e.g., the Internet) via a network adapter 268. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A charging system of a vehicle, comprising:
a charging device configured to transfer an electric charge between a battery system of the vehicle and a recipient energy storage system, the charging device including a plurality of conversion stages;
a switching system configured to selectively bypass one or more conversion stages during a charging process, the charging process including transferring electric charge from the battery system to the recipient energy storage system; and
a first controller configured to operate the switching system based on a voltage range of a recipient charge port of the recipient energy storage system.

2. The charging system of claim 1, wherein the recipient energy storage system is a battery of a recipient vehicle.

3. The charging system of claim 1, wherein the charging device includes a bidirectional charger having a direct current (DC)-DC conversion circuit and a DC-alternating current (AC) conversion circuit.

4. The charging system of claim 3, wherein the switching system includes a first set of switches connected to a donor charge port of the vehicle and to a bus of the charging device between the DC-AC conversion circuit and the battery system, the first set of switches configured to be closed to bypass both the DC-DC conversion circuit and the DC-AC conversion circuit.

5. The charging system of claim 4, wherein the switching system includes a second set of switches connected to the donor charge port and to the bus of the charging device between the DC-DC conversion circuit and the DC-AC conversion circuit, the first set of switches configured to be closed to bypass the DC-AC conversion circuit.

6. The charging system of claim 5, wherein the first controller is configured to determine whether the recipient charge port is compatible with an output voltage of the battery system, and the first controller is configured to:
close the first set of switches prior to an onset of the charging process based on the recipient charge port being compatible with the output voltage; and
close the second set of switches prior to the onset of the charging process based on the recipient charge port being incompatible with the output voltage.

7. The charging system of claim 1, wherein the first controller is configured to communicate with a second controller of the recipient energy storage system, the second controller configured to control a charger connected to the recipient energy storage system.

8. The charging system of claim 7, wherein the charger includes a switching assembly configured to selectively bypass an AC-DC conversion stage of the charger.

9. The charging system of claim 8, wherein the second controller is configured to close the switching assembly based on a request from the first controller.

10. A method of transferring charge, comprising:
connecting a charging device of a vehicle to a recipient charge port of a recipient energy storage system, the charging device configured to transfer an electric charge between a battery system of the vehicle and a donor charge port the recipient energy storage system, the charging device including a plurality of conversion stages;
controlling a switching system based on a voltage range of the recipient charge port, the switching system configured to selectively bypass one or more conversion stages of the charging device; and
performing a charging process, the charging process including transferring electric charge from the battery system to the recipient energy storage system.

11. The method of claim 10, wherein the recipient energy storage system is a battery of a recipient vehicle.

12. The method of claim 10, wherein the charging device includes a bidirectional charger having a direct current (DC)-DC conversion circuit and a DC-alternating current (AC) conversion circuit.

13. The method of claim 12, wherein the switching system includes a first set of switches connected to a donor charge port of the vehicle and to a bus of the charging device between the DC-AC conversion circuit and the battery system, the first set of switches configured to be closed to bypass both the DC-DC conversion circuit and the DC-AC conversion circuit.

14. The method of claim 13, wherein the switching system includes a second set of switches connected to the donor charge port and to the bus of the charging device between the DC-DC conversion circuit and the DC-AC conversion circuit, the first set of switches configured to be closed to bypass the DC-AC conversion circuit.

15. The method of claim 14, wherein controlling the switching system includes:
determining whether the recipient charge port is compatible with an output voltage of the battery system;
closing the first set of switches prior to an onset of the charging process based on the recipient charge port being compatible with the output voltage; and
closing the second set of switches prior to the onset of the charging process based on the recipient charge port being incompatible with the output voltage.

16. The method of claim 10, wherein the vehicle is configured to communicate with a recipient controller of the recipient energy storage system, the recipient controller configured to control a charger connected to the recipient energy storage system.

17. The method of claim 16, wherein the charger includes a switching assembly configured to selectively bypass an AC-DC conversion stage of the charger, and the method includes requesting that the recipient controller close the switching assembly.

18. A vehicle system, comprising:
a battery system; and
a charging system connected to the battery system of a vehicle, the charging system including:
a charging device configured to transfer an electric charge between a battery system of the vehicle and a recipient energy storage system, the charging device including a plurality of conversion stages;
a switching system configured to selectively bypass one or more conversion stages during a charging process, the charging process including transferring electric charge from the battery system to the recipient energy storage system; and a first controller configured to operate the switching system based on a voltage range of a recipient charge port of the recipient energy storage system.

19. The vehicle system of claim 18, wherein the charging device includes a bidirectional charger having a direct current (DC)-DC conversion circuit and a DC-alternating current (AC) conversion circuit.

20. The vehicle system of claim 19, wherein the switching system includes at least one of:
- a first set of switches connected to a donor charge port of the vehicle and to a bus of the charging device between the DC-AC conversion circuit and the battery system, the first set of switches configured to be closed to bypass both the DC-DC conversion circuit and the DC-AC conversion circuit; and
- a second set of switches connected to the donor charge port and to the bus of the charging device between the DC-DC conversion circuit and the DC-AC conversion circuit, the first set of switches configured to be closed to bypass the DC-AC conversion circuit.

* * * * *